Sept. 14, 1954   C. D. FOX   2,689,093
RECONDITIONING APPARATUS FOR BAGGED MATERIAL
Filed March 2, 1953   2 Sheets-Sheet 1

INVENTOR.
Clarence D. Fox
BY
Frease & Bishop
ATTORNEYS

Sept. 14, 1954  C. D. FOX  2,689,093
RECONDITIONING APPARATUS FOR BAGGED MATERIAL
Filed March 2, 1953  2 Sheets-Sheet 2

INVENTOR.
*Clarence D. Fox*
BY
*Frease & Bishop*
ATTORNEYS

Patented Sept. 14, 1954

2,689,093

UNITED STATES PATENT OFFICE 2,689,093

RECONDITIONING APPARATUS FOR BAGGED MATERIAL

Clarence D. Fox, St. Hilaire on Richelieu, Quebec, Canada, assignor of one-half to Maurice S. Cotterell, North Sidney, Cape Breton County, Nova Scotia, Canada Application March 2, 1953, Serial No. 339,707

9 Claims. (Cl. 241—199)

The invention relates to machines for reconditioning materials which have become hardened in storage, or by moisture or other conditions, and more particularly to certain improvements upon my prior United States patents No. 2,529,548 of November 14, 1950 and No. 2,595,237 of May 6, 1952.

Many granular or powdered materials, such as sugar, salt and the like, which are ordinarily put up in cloth or heavy paper bags for storage and shipment, frequently become quite hard when stored for any length of time, particularly where there is considerable moisture in the air.

My prior patents, above referred to, disclose apparatus for reconditioning or loosening the hardened mass of bagged material, and the present invention is concerned with improvements upon this general type of machine.

An object of the invention is to provide mechanism for transmitting reciprocating or oscillating motion to the back and breaker plates, at the same time causing the side plates to act on the bagged material with a true circular motion in the line of the major axis of the bag.

Another object is to provide apparatus of the character referred to in which the breaker and back plates and side plates are all operatively connected to cross heads eccentrically mounted upon a pair of parallel shafts.

A further object is to provide a machine of the character referred to in which the back plate is operatively connected to a hydraulic cylinder to which pressure is supplied by a pump driven by one of the parallel shafts.

Figure 1:
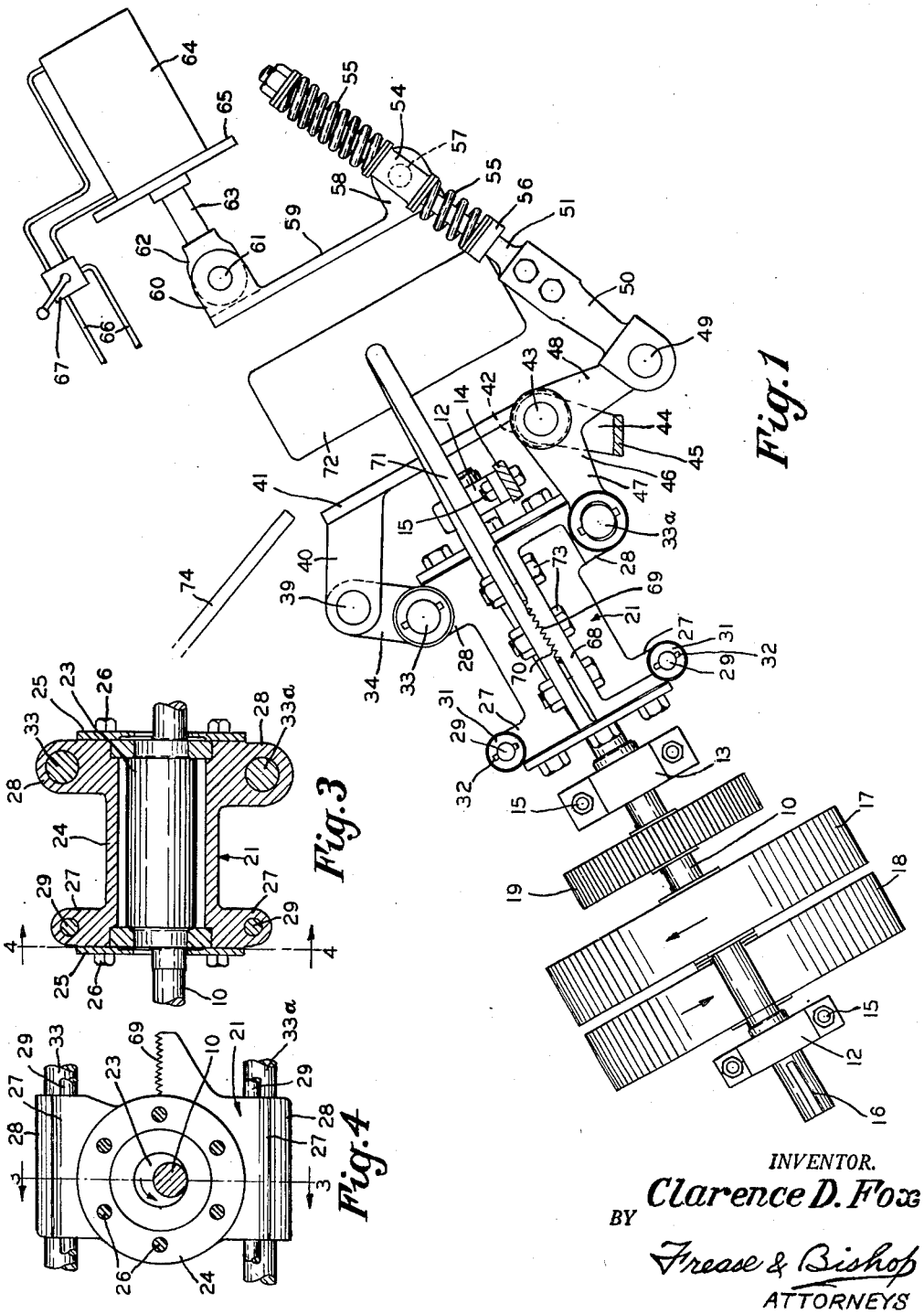
Figure 2:
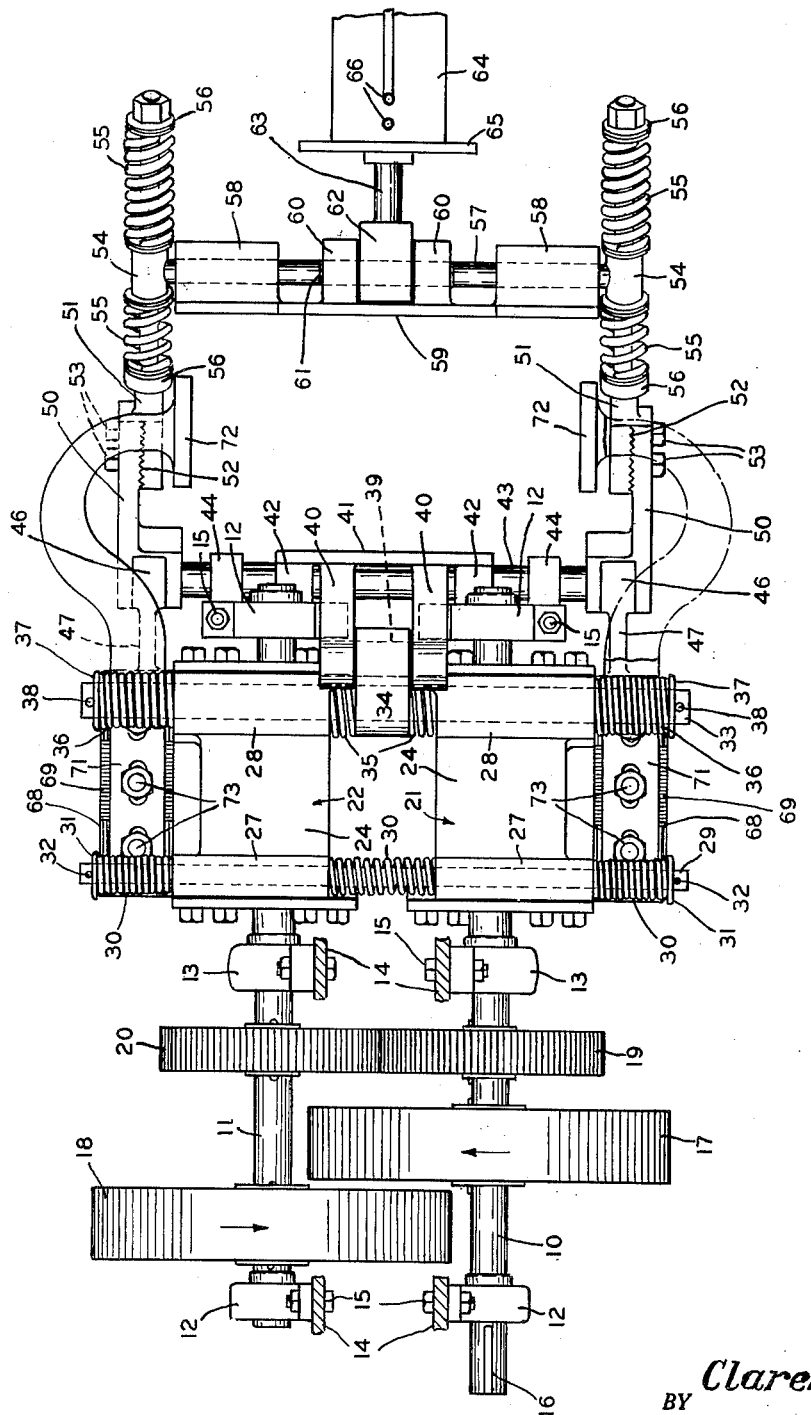

The above and other objects apparent from the drawings and following description may be attained by the apparatus, construction, arrangements, combinations, subcombinations and parts which comprise the invention, a preferred embodiment of which, illustrative of the best mode in which applicant has contemplated applying the principle, being set forth in detail in the following description and illustrated in the accompanying drawings, in which;

Fig. 1 is a side elevation of the working parts of the apparatus, the frame of the machine being removed for the purpose of illustration;

Fig. 2 a top plan view of the mechanism shown in Fig. 1;

Fig. 3 a longitudinal, sectional view through one of the eccentrically mounted cross heads, taken as on the line 3—3, Fig. 4; and, Fig. 4 a transverse section of the cross head taken as on the line 4—4, Fig. 3.

Referring now more particularly to the embodiment of the invention illustrated, in which similar numerals refer to similar parts throughout, the machine may include any suitable frame such as shown in my prior patent No. 2,529,548 above referred to, the frame being omitted from the drawings in the present case in order to more clearly illustrate the mechanism to which the invention pertains.

A pair of parallel shafts 10 and 11 are journalled in axial bearings 12 and thrust bearings 13, mounted upon suitable stationary portions of the frame, as indicated at 14, as by bolts 15 or the like.

As shown in Fig. 1, the shafts 10 and 11 may be positioned at any set angle between the horizontal and vertical, depending upon the angle at which the back and breaker plates and side plates are positioned, as will be later explained. Either one of the shafts may be driven, the drawings showing the shaft 10 provided with conventional means indicated at 16 for connecting it to any suitable driving means.

Fly wheels 17 and 18 are fixed upon the shafts 10 and 11 respectively, and spur gears 19 and 20 respectively are also fixed upon the shafts and mesh with each other. The shafts 10 and 11 are driven in the directions of the arrows shown upon the fly wheels in Figs. 1 and 2, the rotation of the shafts in opposite directions being synchronized through the operation of the spur gears 19 and 20.

Similar cross heads 21 and 22 are eccentrically mounted upon the shafts 10 and 11 respectively, by means of eccentric devices 23 fixed to or formed upon the shafts and received within the cylindrical portions 24 of the cross heads.

Cap plates 25 may be attached to opposite ends of the cross heads by means of the cap screws 26 or the like, for operatively connecting the cross heads to the eccentric portions of the shafts. Each of the cross heads has a pair of transversely disposed, bored bosses 27 and 28 formed upon opposite ends thereof.

As shown in the drawings, the bosses 27 are located at one end of each cross head and the bosses 28, which are of somewhat larger diameter, are located at the opposite end.

Guide rods 29 are slidably located through the bosses 27 and shock absorbing springs 30 are located thereon, between the cross heads and at each extremity thereof, washers 31 and cotter pins or the like 32 being provided upon the ends of the guide rod 29 in contact with the outermost springs 30.

A guide rod 33, preferably of considerably larger diameter than the guide rods 29, is slidably located through the bored bosses 28 on the upper sides of the cross heads 21 and 22, and one end of a toggle arm 34 is mounted thereon.

Shock absorber springs 35 are located between the cross heads 21 and 22 and the toggle arm 34, and shock absorber springs 36 are located upon each extremity of the guide rod 33, washers 37 and cotter pins 38, or the like, being located upon the extremities of the guide rod for retaining the springs.

The other end of the toggle arm 34 is loosely connected to the pin 39 which is rigidly fixed in the bracket arms 40, integrally formed upon or rigidly attached to the back of the breaker backing plate 41 at the upper end thereof.

A guide rod 33a, similar to the guide rod 33, is slidably located through the bored bosses 28 on the lower sides of the cross heads 21 and 22 and is provided with shock absorber springs such as above described.

Thus, by the rotation of the shafts 10 and 11 in opposite directions as above described, the cross heads 21 and 22, through the eccentrics 23, will move laterally upon the guide rods, at the same time imparting an upward and downward movement to the guide rods.

Brackets 42 are formed at the lower end of the back plate 41 and a shaft 49 is journalled therein, said shaft being in turn journalled in suitable brackets 44 fixed upon a cross member of the frame, as indicated at 45 in Fig. 1.

Bell cranks 46 are mounted upon the extremities of the shafts 43, one arm 47 of each bell crank being connected to and free to swivel upon the adjacent extremity of the cross head guide rod 33a. The other arm 48 of each of the bell cranks 46 is connected by pivot pin 49 to a connecting rod 50.

For the purpose of providing for adjustment this connecting rod is preferably formed in sections, the section 51 being adjustably secured to the section 50 by means of the serrations 52 on both members and cap screws 53 or the like for holding the two sections in adjusted position.

T-members 54 are slidably mounted upon the sections 51 of the connecting rods, and coil springs 55 are interposed between opposite ends of the T-members and the shoulders 56 upon the connecting rod member 51. The T-members 54 are mounted upon the extremities of a shaft 57 which is journalled in bearings 58 formed upon or integrally connected to the lower end of the back plate 59.

Bearing brackets 60 are fixed to the upper end of the backing plate 59 and carry a pin 61 on which is mounted the bracket 62 connected to the extremity of the piston rod 63 of a hydraulic cylinder 64 having a flanged head 65 for mounting on a cross member of the frame.

Hydraulic pressure is supplied to the cylinder 64 through suitable lines 66 leading from a pump and accumulator (not shown), the pump being preferably driven by the shaft 11. A valve 67 is provided in the lines 66 for controlling hydraulic pressure to the cylinder 64.

A platform or rib 68 is formed upon the outer side of each cross head 21 and 22, and provided with a serrated upper surface 69 for engagement with a similar serrated lower surface 70 on the corresponding arm 71, which arms carry the side plate backing plates 72. Bolts 73 are provided for holding the arms 71 in adjusted position upon the platforms 68.

Suitably shaped breaker plate, back plate and side plates, for actual contact with the bags, are mounted upon the backing plates 41, 59 and 72 respectively, these plates being of the design shown in my prior patent No. 2,529,548, above referred to.

In the operation of the machine, the bagged material is introduced down a chute 73, into the opening between the plates, and as the bag of material passes downward by gravity between the plates, the side plates 72 will, through the eccentrically mounted cross heads 21 and 22, be moved in opposed circular paths intermittently contacting opposite sides of the bag as these plates move downwardly and inwardly toward each other, the bag thus successively sustaining a crushing action between the side plates.

At the same time, the breaker plate and back plate 41 and 59 respectively, will be oscillated, the lower end of the breaker plate pivoting upon the guide rod 43 while the upper end thereof moves inward and outward intermittently contacting the bag.

The back plate 59 being pivoted at its upper end upon the bag 61 will be oscillated upon this pivot, the lower end of the back plate being intermittently moved into and out of contact with the bag through the action of the eccentrically mounted cross heads 21 and 22, the bell cranks 46 and the connecting rods 50—51.

The position and rigidity of the bracket 62, upon which the upper end of the back plate is pivoted, is variable and may be controlled through the hydraulic or pneumatic cylinder 64, as above described. The hardened material in the bag will be quickly loosened up and reconditioned as it passes downward between the plates.

Although the machine is shown with the main longitudinal axis of the plates 41, 59 and 72, located at an angle of about 30 degrees to the vertical, as shown in Fig. 1, it should be understood that the machine may be mounted in any position with the main longitudinal axis of the plates at any angle from the horizontal to the vertical, to suit various working conditions.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. Apparatus for conditioning bagged material, comprising a pair of parallel members, eccentric means causing said members to move in circular paths in opposite directions toward and from each other, a longitudinally disposed arm fixed upon the outer side of each member, opposed spaced side plates rigidly mounted upon said arms, a breaker plate located between said arms at right angles to the side plates, means pivotally mounting the lower end of the breaker plate, means including toggle arms operatively connecting the upper end of the breaker plate to said members, a back plate spaced from and opposed to the breaker plate, means pivoting the upper end of the back plate, and means including bell crank levers operatively connecting the lower end of the back plate to said members.

2. Apparatus for conditioning bagged material, comprising a pair of parallel shafts, means for rotating said shafts in opposite directions, an eccentric mounted upon each shaft, a cross head mounted upon each eccentric, a longitudinally disposed arm fixed upon the outer side of each cross head, opposed spaced side plates rigidly mounted upon said arms, a breaker plate located between said arms at right angles to the side plates, means pivotally mounting the lower end of the breaker plate, transversely disposed upper and lower guide rods slidably mounted upon said cross heads, toggle arms operatively connecting the upper guide rod to the upper end of the breaker plate, a back plate spaced from and opposed to the breaker plate, means pivoting the upper end of the back plate, and means including bell crank levers operatively connecting the lower guide rod to the lower end of the back plate.

3. Apparatus for conditioning bagged material, comprising a pair of parallel shafts, means for rotating said shafts in opposite directions, an eccentric mounted upon each shaft, a cross head mounted upon each eccentric, a longitudinally disposed arm fixed upon the outer side of each cross head, opposed spaced side plates rigidly mounted upon said arms, a breaker plate located between said arms at right angles to the side plates, means pivotally mounting the lower end of the breaker plate, transversely disposed upper and lower guide rods slidably mounted upon said cross heads, toggle arms operatively connecting the upper guide rod to the upper end of the breaker plate, a back plate spaced from and opposed to the breaker plate, means pivoting the upper end of the back plate, and means including bell crank levers and connecting rods operatively connecting the lower guide rod to the lower end of the back plate.

4. Apparatus for conditioning bagged material, comprising a pair of parallel members, eccentric means causing said members to move in circular paths in opposite directions toward and from each other, a longitudinally disposed arm fixed upon the outer side of each member, opposed spaced side plates rigidly mounted upon said arms, a breaker plate located between said arms at right angles to the side plates, means pivotally mounting the lower end of the breaker plate, means including toggle arms and connecting rods operatively connecting the upper end of the breaker plate to said members, a back plate spaced from and opposed to the breaker plate, means pivoting the upper end of the back plate, and means including bell crank levers operatively connecting the lower end of the back plate to said members.

5. Apparatus for conditioning bagged material, comprising a pair of parallel cross heads, eccentric means causing said cross heads to move in circular paths in opposite directions toward and from each other, a longitudinally disposed arm fixed upon the outer side of each cross head, opposed spaced side plates rigidly mounted upon said arms, a breaker plate located between said arms at right angles to the side plates, means pivotally mounting the lower end of the breaker plate, transversely disposed upper and lower guide rods slidably mounted upon said cross heads, toggle arms operatively connecting the upper guide rod to the upper end of the breaker plate, a back plate spaced from and opposed to the breaker plate, means pivoting the upper end of the back plate, and means including bell crank levers operatively connecting the lower guide rod to the lower end of the back plate.

6. Apparatus for conditioning bagged material, comprising a pair of parallel cross heads, eccentric means causing said cross heads to move in circular paths in opposite directions toward and from each other, a longitudinally disposed arm fixed upon the outer side of each cross head, opposed spaced side plates rigidly mounted upon said arms, a breaker plate located between said arms at right angles to the side plates, means pivotally mounting the lower end of the breaker plate, transversely disposed upper and lower guide rods slidably mounted upon said cross heads, toggle arms operatively connecting the upper guide rod to the upper end of the breaker plate, a back plate spaced from and opposed to the breaker plate, means pivoting the upper end of the back plate, and means including bell crank levers and connecting rods operatively connecting the lower guide rod to the lower end of the back plate.

7. Apparatus for conditioning bagged material, comprising a pair of parallel members, eccentric means causing said members to move in circular paths in opposite directions toward and from each other, a longitudinally disposed arm fixed upon the outer side of each member, opposed spaced side plates rigidly mounted upon said arms, a breaker plate located between said arms at right angles to the side plates, means pivotally mounting the lower end of the breaker plate, means including toggle arms operatively connecting the upper end of the breaker plate to said members, a back plate spaced from and opposed to the breaker plate, means pivoting the upper end of the back plate, and means including bell crank levers operatively connecting the lower end of the back plate to said members, and means for adjusting the position of the means pivoting the upper end of the back plate.

8. Apparatus for conditioning bagged material, comprising a pair of parallel shafts, means for rotating said shafts in opposite directions, an eccentric mounted upon each shaft, a cross head mounted upon each eccentric, a longitudinally disposed arm fixed upon the outer side of each cross head, opposed spaced side plates rigidly mounted upon said arms, a breaker plate located between said arms at right angles to the side plates, means pivotally mounting the lower end of the breaker plate, transversely disposed upper and lower guide rods slidably mounted upon said cross heads, toggle arms operatively connecting the upper guide rod to the upper end of the breaker plate, a back plate spaced from and opposed to the breaker plate, means pivoting the upper end of the back plate, means including bell crank levers operatively connecting the lower guide rod to the lower end of the back plate, and means for adjusting the length of said arms.

9. Apparatus for conditioning bagged material, comprising a pair of parallel shafts, means for rotating said shafts in opposite directions, an eccentric mounted upon each shaft, a cross head mounted upon each eccentric, a longitudinally disposed arm fixed upon the outer side of each cross head, opposed spaced side plates rigidly mounted upon said arms, a breaker plate located between said arms at right angles to the side plates, means pivotally mounting the lower end of the breaker plate, transversely disposed upper and lower guide rods slidably mounted upon said cross heads, toggle arms operatively connecting the upper guide rod to the upper end of the breaker plate, a back plate spaced from and opposed to the breaker plate, means pivoting the upper end of the back plate, means including bell crank levers and connecting rods operatively connecting the lower guide rod to the lower end of the back plate, and means for adjusting the length of said connecting rods.

No references cited.